United States Patent Office 3,207,594
Patented Sept. 21, 1965

3,207,594
METHOD FOR PREPARATION OF HERBICIDAL ASPHALT EMULSION
Irven F. Wagner, Ponca City, Okla., assignor to Esso Research and Engineering Company, a corporation of Delaware
No Drawing. Filed Sept. 18, 1962, Ser. No. 224,560
1 Claim. (Cl. 71—2.6)

The present invention is broadly concerned with establishing and sustaining agricultural crops in semi-arid areas by new and improved methods for conserving and utilizing available moisture. The invention is more particularly concerned with a unique asphaltic composition which comprises herbicides. In particular, the present invention relates to petroleum based coatings and to their use in new and improved methods for establishing and sustaining grass and other crops on land which receive an insufficient amount of natural rainfall to provide sufficient moisture in the soil for seed germination and to sustain the growth of such crops and to prevent the growth of weeds during the critical seedling stage without irrigation. Specifically, the composition of the present invention comprises an asphalt emulsion containing a pre-emergence weed killer which emulsion has a very high degree of stability and wherein the sizes of the asphalt particles are relatively low.

The present application is a continuation-in-part of Serial No. 165,653, filed January 11, 1962, now abandoned, entitled "Improved Herbicidal Asphaltic Mulches," inventor, Irven F. Wagner.

The present invention is particularly concerned with a unique asphalt composition and its application for use as an agricultural mulch. In essence, it is very desirable that the asphalt composition on the ground be a relatively hard asphalt having definite characteristics. It is also essential that the asphalt composition be emulsified, preferably as asphalt and water emulsion, so as to permit its efficient application to the ground so as to secure the desired spreading characteristics. It is essential that the emulsion be stable and not break until it is on the ground since these emulsions must be transported over a wide territorial area and ultimately be placed on the ground in the desired areas by suitable spreading equipment.

Millions of acres of potentially valuable grazing lands in the western half of the United States along with areas even more vast in other countries normally do not receive sufficient rainfall to reseed and establish grass crops suitable to maintain livestock within economically feasible geographical limits. Imprudent management in marginal cropping areas and overgrazing of poorly established grasslands followed by wind erosion has only served to accentuate the problem. Attempts to seed or reseed these semi-arid lands with suitable range grasses have resulted in the expenditure of large sums in labor and material. Even so, the seeding techniques employed in the past have been only about 10 to 30% successful in the moisture limited areas.

It has now been discovered that the moisture necessary for both seed germination and early plant growth can be maintained in the seed bed by applying certain asphalt emulsions over such seed beds according to the methods hereinafter set forth in detail. It has also been discovered that unexpected desirable results are secured by using an asphalt emulsion with a pre-emergence weed-killer.

According to this invention the emulsion is preferably applied after seeding and preferably when the moisture content of the seed bed is at or near field capacity. Field capacity is defined as the amount of water held in the soil after excess water has drained away via gravitational force and after the rate of downward movement of water has materially decreased. The asphalt strip covering the seed bed then tends to function in a manner similar to a "one way valve." When a rainfall occurs which is sufficient to temporarily saturate the top layer of soil the lateral movement of moisture is relatively rapid, i.e. at a rate of several inches per hour with some variance which is dependent upon the type of soil. When rainfall ceases and the field drains or is otherwise depleted of moisture to the level of field capacity or below, the rate of lateral migration drops off sharply until such movement is negligible and for all practical purposes may be considered as non-existent. During the short periods of surface saturation rainfall on the uncoated areas will move under the coated strips to replenish the moisture of the seed bed. When the saturated condition in the uncoated areas ceases to exist, the moisture which has moved beneath the coated strips is trapped and will not be lost to any appreciable extent either by lateral movement or surface evaporation.

In accordance with the present invention, by utilizing an asphalt applied as described above in conjunction with a pre-emergence weed-killer, unexpected desirable results are secured. Also in accordance with the present invention, stable cationic asphalt emulsions are prepared wherein the sizes of the asphalt particles are relatively low. This is very desirable since the usual procedure is to spray the emulsion using various types of nozzles, spraying equipment and the like. If the emulsion should be relatively unstable and if large particles should form, it would not permit the application of the asphalt to the desired area utilizing conventional spray and nozzle equipment. In many instances this would not permit the use of the asphaltic mulch.

Asphalt emulsions which are suitable for use with this invention may be either acidic (cationic) or basic (anionic) although the acidic emulsions are preferred. Both are asphalt-in-water emulsions. Typical specifications for both types are listed in the following table.

TABLE I.—CHARACTERISTICS AND COMPOSITION OF ACIDIC AND BASIC EMULSION CONCENTRATES

| | Basic | Acidic |
|---|---|---|
| Emulsion Characteristics: | | |
| Viscosity, Saybolt Furol at 77° F | 10–200 | 10–200 |
| Residue (by distillation), wt. percent | 57–70 | 57–70 |
| Settlement, 5 days, Wt. percent | 0–20 | 0–20 |
| Residue Characteristics: | | |
| Penetration at 77° F., 100 g.; 5 sec | 10–200 | 10–200 |
| Solubility in CS$_2$, percent | 97+ | 97+ |
| Ductility at 77° F., cm | 40+ | 40+ |
| Softening Point, ° F | 100–175 | 100–175 |
| Composition, Wt. percent: | | |
| Water | 30–43 | 30–43 |
| Asphalt | 57–70 | 57–70 |
| Emulsifier (Preferably polyamines for acidic emulsions, fatty acids for basic) | 0.10–10.0 | 0.10–10.0 |
| NaOH | 0.1–10.0 | |
| HCl (36%) | | 0.1–1.0 |

Suitable emulsifying agents for use in preparing these emulsions include the following:

*Cationic agents*

(1) Primary, secondary, tertiary, and polyamine salts such as the diamine dichloride.

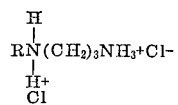

where R is an alkyl chain with 16–18 carbon atoms. In general, the alkyl chains of the amines may contain 8–22 carbon atoms with 16–18 being preferred.

(2) Amines such as those used in forming the salts of (1) condensed with 1–10 moles of ethylene oxide per mole of amine such as

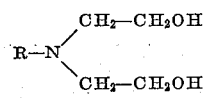

where R is as defined in (1).

(3) Quaternary ammonium salts such as [R₃—N]⁺Cl⁻.
(4) Dimethylated amine salts such as

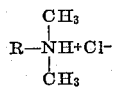

(5) Aromatic amine salts and cyclic amine salts.
(6) 2-imidazoline.
(7) Other non-conventional diamines such as Duomeen T (C₁₈H₃₇—NH—(CH₂)₃NH₂).

*Anionic agents*

Alkali metal salts of fatty acids such as

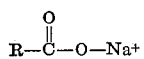

where R is an alkyl or olefinic chain with 8–22 carbon atoms, preferably 14–18. The potassium salt may also be used. Also, the emulsifying agent is not always one specific compound but could be a mixture of salts of fatty acids in which R varied in length. Examples of these are a sodium salt of pine wood lignin and a salt of a long chain acid resin from the destructive distillation of pine wood stumps; also fine clays such as bentonite can be used.

Whereas, the actual emulsifying agents for the cationic and anionic emulsions are the amine salts or fatty acid salts, these salts are usually formed in the aqueous emulsifying solution by reaction of the amine with an acid such as HCl and the fatty acid with a base such as NaOH. Possible substitutes for the HCl and NaOH therefore exist. Acetic acid (CH₃COOH) or nitric acid (HNO₃) could be used instead of HCl on a mole per mole basis. Also, KOH could be used instead of NaOH although the latter is cheaper.

For the purposes of this invention the emulsions set forth in Table I may, for want of a better term, be referred to as emulsion concentrates. For the purposes of this invention, such emulsions are further diluted with 0.1 to 3 parts of water prior to application. For minimizing evaporation losses with soils in general it has been found that optimum results are obtained when about 1.0 to 1.70, preferably about 1.3, volumes of water are employed per equivalent volume of emulsion concentrate. More specifically, maximum effectiveness in retarding evaporation from a silt loam type soil while using a minimum amount of emulsion is obtained by spraying onto the soil an emulsion as characterized in Table I diluted to the extent of 1.18±0.25 to 1.47±0.25 volumes of water per volume of emulsion, such dilution increasing linearly from the low dilution to the higher dilution as the soil density decreases from about 1.60 to 1.20 gm./cm.³. These emulsions may be prepared in the conventional manner, as follows:

The emulsifying solution of the desired formulation at a temperature of 120° to 150° F. and the asphalt at a temperature of about 240° F. may be fed in separate streams to a conventional colloid mill. Other conventional techniques for effecting emulsification may be employed if colloid milling is not convenient. The preferred emulsification temperature is about 180°–190° F. A thin continuous film of such emulsions will retard evaporation rates by 90 to 99% as compared to bare soil. Such emulsions (based on undiluted emulsion concentrate) should be applied at a rate in the range of 150 to 1000, preferably 250 to 750 ga. per acre of coverage. Thus, the present invention is concerned with the use of asphalt emulsions, particularly acidic asphalt emulsions with a herbicide. The asphalt emulsions may comprise from about 20 to 75% by weight of asphalt and 80 to 25% by weight of water. However, it is preferred that the herbicides of the present invention be utilized in asphalt emulsions where the percent by weight of asphalt present is in the range from about 40 to 55% by weight.

As pointed out heretofore, the present invention is specifically concerned with the preparation of a stable asphalt emulsion wherein large asphalt particles will not form, thus making it possible to apply the asphalt containing herbicide to the ground utilizing sprays and other equipment. Furthermore, when the asphalt particles are relatively small, a much better distribution of the asphalt emulsion is secured on the ground, thereby securing far greater ground coverage per unit weight of asphalt. The distribution and effectiveness of the added herbicide is also greatly enhanced by the use of relatively small particles of asphalt. Specifically, stable cationic asphalt emulsions containing the herbicides Alanap-1 (N-1-naphthyl phthalamic acid) and Diuron (3-(3,4-dichlorophenyl)-1,1-dimethyl urea) are secured by the techniques of the present invention. In essence, these herbicides are applied as hydrohalide salts, specifically as the hydrochloride salts. These herbicide containing emulsions are very valuable agricultural mulches particularly for cucurbit crops. Also, for the reasons given heretofore, it is essential that the particle size of the asphalt be relatively small and that the build-up of particles which will be retained on a 20 mesh screen be no greater than about 0.01% of the total material.

The process of preparation and the desirable asphalt compositions of the present invention may be readily understood by the following examples illustrating embodiments of the same.

EXAMPLE 1

Because of the basicity of the amine group of Alanap-1, it is necessary to add acid with the herbicide to prevent reaction of Alanap-1, and the cationic emulsifier of acidic emulsions. However, only adding acid, even on a mole per mole basis, is not adequate as shown by the following.

To 1770 gm. of screened asphalt emulsion of the following composition—

66% asphalt
34% water
0.2% Duomeen T (C₁₈H₃₇—NH—(CH₂)₃—NH₂)
0.1% conc. HCl, (36%)

was added a mixture of 530 gm. water, 36.5 gm. Alanap-1, and 11.2 gm. conc. HCl which had been run through a colloid mill. Sieve tests after 7 and 21 days gave percentages of 0.0660% and 0.495% retained on a 20 mesh screen.

The present invention prevents the severe build-up of large asphalt particles by refluxing the Alanap-1 and HCl mixture in water for several hours. The effect of this refluxing is shown in Example 2.

EXAMPLE 2

A mixture of 530 gm. water, 36.5 gm. Alanap-1, and 11.2 gm. conc. HCl was refluxed for 5 hours. The suspension was then cooled, run through a colloid mill, and added with stirring to 1770 gm. of screened asphalt emulsion of the same composition as in Example 1. Sieve tests after 7 and 21 days gave percentages of 0.0284% and 0.174% retained on a 20 mesh screen.

Example 2, when compared with Example 1, clearly shows the large beneficial effects of the novel refluxing step. By combining this refluxing step with the use of a higher emulsifier content in the asphalt emulsion a satisfactory product is obtained as shown by Example 3.

EXAMPLE 3

A mixture of 600 gm. water, 52.2 gm. Alanap-1, and 15.96 gm. conc. HCl was refluxed for 5 hours, cooled, and run through a colloid mill. An asphalt emulsion with twice the emulsifier content given in Example 1 was prepared by adding a mixture of 200 gm. water, 5.4 gm. Duomeen T, and 2.7 gm. conc. HCl to 2700 gm. of screened asphalt emulsion with the composition of Example 1. To the resulting asphalt emulsion with the higher emulsifier content was added the refluxed Alanap-1 suspension. Sieve tests after 7, 14 and 28 days gave percentages of 0.0150%, 0.00914% and 0.0107% retained on a 20 mesh screen.

A summary of the data secured is shown in the following table.

|  | Example 1 | Example 3 |
|---|---|---|
|  | Grams | Grams |
| Asphalt | 1,165.0 | 1,780.0 |
| Water | 605.0 | 920.0 |
| Duomeen T | 3.5 | 5.4 |
| HCl 36% | 1.7 | 2.7 |
| Water | 530.0 | 600.0 |
| Alanap | 36.5 | 52.2 |
| HCl | 11.2 | 15.9 |
| Water |  | 200.0 |
| Duomeen |  | 5.4 |
| HCl |  | 2.7 |

Thus, in Example 1, about 1700 grams of water and asphalt contained 5.2 grams of Duomeen T and HCl (about 0.3% by weight). In Example 3, 2900 grams of water and asphalt prior to addition of the herbicide contained 16.2 grams of Duomeen T and HCl (about 0.56% by weight).

From the foregoing, it is apparent that it is desirable to reflux the herbicide for a period of from 1 to 4 hours, preferably for a period of about 2 to 3 hours. It is also preferred that the emulsifiers in the asphalt solution be present in a concentration about 0.4%, preferably present in a concentration in the range from about .6 to 1.0% by weight.

EXAMPLE 4

Ten grams of technical grade Diuron was dissolved in 30 grams of n-butyl amine at a temperature of about 150° F. This solution of herbicide in amine was added with stirring to a mixture of 30 gm. water, 5 gm. Duomeen T ($C_{18}H_{37}$—NH—($CH_2$)$_3$—$NH_2$) and 2.5 gm. conc. HCl (36%) which was at a temperature of 160° F. This mixture was allowed to cool, precipitate the fine Diuron crystals, and form a gel. An additional 182 gm. of water and 41.6 gm. of conc. HCl was added to the herbicide suspension before the suspension was mixed with the asphalt emulsion. Also, the suspension was dispersed in a colloid mill. The 41.6 gm. quantity of HCl in this case was needed to form the hydrochloride salt of the amine solvent so that the amine didn't react with the emulsifier of the asphalt emulsion. Using other types of solvents or flashing of the solvent would eliminate the need for this HCl.

The suspension from the colloid mill was added to 970 gm. of an asphalt emulsion containing—

| | Percent |
|---|---|
| Asphalt | 66 |
| Water | 34 |
| Duomeen T | 0.2 |
| HCl (36%) | 0.1 |

The asphalt emulsion was stirred mechanically during the addition. The asphalt emulsion had been screened through a 20 mesh screen prior to addition of the herbicide and had no particles larger than 20 mesh.

After 7 days and 21 days, 250 gm. samples of the mixture described above were screened using a 20 mesh screen. The percent of the total mixture retained on the screen was 0.0086% and 0.0075% after 7 and 21 days respectively. Also, there was no build-up of crystalline herbicide on the bottom of the storing containers, even after 21 days.

EXAMPLE 5

To 800 gm. of water was added 22.2 gm. of technical Diuron crystals, 12.74 gm. of conc. HCl, and 1.32 gm. of Duomeen T. The mixture was heated to 150° F. and run through a colloid mill to disperse the Diuron. This suspension was added with mechanical stirring to 2700 gm. of screened asphalt emulsion of the same formulation as in Example 1. Samples containing 500 cc. each were set aside for periodic sieve analyses. Within a week, there was a layer of Diuron which had settled to the bottom of the storing containers. Before running sieve analyses the emulsion-herbicide mixtures were shook to redistribute the herbicide. Sieve analyses (20 mesh screen) after 7, 14 and 28 days gave 0.0174%, 0.0163% and 0.0363% of the total material retained on the screen.

In general, various herbicides may be utilized as, for example, those selected from the following table.

CHEMICAL NAMES OF HERBICIDES

| Trade name: | Chemical name |
|---|---|
| Alanap #1 | N - 1 - naphthyl phthalamic acid. |
| Alanap #3 | Sodium salt of N-1-naphthyl phthamalic acid. |
| Amine DNOSBP | Amine salts of 4,6-dinitro ortho secondary butyl phenol. |
| DNOSBP | 4,6 - dinitro ortho secondary butyl phenol. |
| Chloro IPC | Isoprophyl N - meta - chlorophenyl carbamate. |
| Vegadex | 2-chloroallyl - diethyl - dithiocarbamate. |
| Randox | α - Chloro-N,N - diallylacetamide. |
| Eptam | Ethyl N,N - di - n - propylthiol carbamate. |
| Diuron | 3 - (3,4 - dichlorophenyl)-1,1-dimethylurea. |
| Monuron | 3 - (p - chlorophenyl) - 1,1-dimethylurea. |
| Atrazine | 2 - chloro - (4 ethyl amino 6 - isopropyl amine) - S - triazine. |
| Simazine | 2 - c h l o r o - 4,6 - bis(ethylamino)-S-triazine. |
| 2,4-D | 2,4-dichloro phenoxy acetic acid. |
| Sesone | Sodium 2,4 - dichlorophenoxyethyl sulfate. |
| Dalapon | 2,2-dichloropropionic acid. |

The preferred herbicides of the present invention for use in acidic asphalt emulsions are the carbamates and amides. Especially desirable types of herbicides are thiolcarbamates and alpha - chloroacetamides. Other particularly desirable herbicides for use in accordance with the present invention are Alanap-1 (N-1-naphthyl phthalamic acid) and Diuron (3-(3,4-dichlorophenyl)-1,1-dimethyl urea).

Suitable carbamates are as follows:

Isopropyl N-phenyl-carbamate
Isopropyl N-meta-chlorophenyl carbamate
Sec. butyl N-(3-chlorophenyl) carbamate
Sec. butyl N-phenyl carbamate
Ethyl-N,N-di-n-propyl thiolcarbamate
Butyl-N,N-di-n-propyl thiolcarbamate
2,3-dichloroallyl diisopropyl thiocarbamate
2-chloroallyl-diethyl-dithiocarbamate Suitable amides are as follows:

α-Chloro-N,N-diallylacetamide
α-Chloro-N,N-diethylacetamide
p,p-Dibutyl-N,N-diisopropylphosphinic amide Preferred emulsifying agents for emulsifying an oily herbicide formulation for use in conjunction with the acidic asphalt emulsion are either nonionic or cationic.

EXAMPLE 6

Eptam results

Eptam (ethyl N,N-di-n-propylthiolcarbamate): Crops were planted at the same time with Eptam applied as a component of an asphalt mulch at a rate of 4 lbs./acre of active ingredient and as a water continuous emulsion at a rate of 4 lbs./acre.

After a period of 3 weeks the beans on the mulched plot were essentially free of weeds. On the plot where Eptam had been applied as an emulsion, several stalks of purslane had emerged.

After a period of 6 weeks the few weeds in the mulched plot had reached a maximum height of approximately four inches. The weeds in the unmulched plot were more numerous and had reached a height of 6 inches or greater.

EXAMPLE 7

Randox results

Randox ($\alpha$-chloro-N,N-diallylacetamide): The crops were planted as before with one set of plots being treated with an asphalt mulch+4 lbs./acre of Randox and another set treated with 4 lbs./acre of Randox applied as an aqueous solution. The crops planted were spinach and tomatoes. Spinach is sensitive to Randox and under certain conditions Randox will kill spinach. The spinach was therefore included to measure the effectiveness of the Randox.

After 6 weeks the mulched plots had essentially no weeds and no spinach indicating excellent herbicide performance. The plots where Randox was applied as an aqueous solution had healthy, normal spinach and was infested with purslane, pigweed and various grasses.

The timing on these data was as follows: Planting—June 16, 1961; 3 weeks' inspection—July 6, 1961; 6 weeks' inspection—July 27, 1961.

The concentration of the herbicide based on the active ingredient may vary in the range from about 0.2% to 6.0%, preferably in the range from about 0.4% to 3.0% as compared to the weight percent of the asphalt present in the emulsion.

It is, of course, within the scope of the present invention to use the mulching compositions herein disclosed along with other mulching compositions and with other agricultural techniques. For example, the ground may be prepared by mulching with peat moss prior to the application of the mulch emulsions herein described. Other soil conditioning agents such as polyacrylates, vermiculite, etc., may be incorporated into the soil before applying the mulch emulsions. Also, pre-emergence herbicides may be soaked into the ground before the herbicidal emulsions of the present invention are applied on the surface of the ground. This procedure is particularly advantageous when the herbicides put into the ground are somewhat volatile. Furthermore, volatile fertilizers, for example ammonia, can be introduced into the ground prior to application of the mulch of the present invention. Under these conditions, the fertilizer can serve to promote the germination of the weeds, which will then be killed by the herbicidal mulch. Similarly, in orchards and olive groves the ground may be sterilized by the action of volatile fumigants, for example chloropicrin, to destroy grubs and nematodes, and the action of the volatile or gaseous fumigants will be enhanced by having the ground covered with a film of mulch substantially impervious to the gases therein.

What is claimed is:

A process for the preparation of a stable, noncoagulating, cationic, pre-emergence weed-killing emulsion of an agricultural mulch which comprises the steps of:

(a) mixing 0.2 to 6.0 parts by weight of an herbicidal compound of phthalamic acid in 20 to 30 parts by weight of an aqueous solution of hydrochloric acid, (b) refluxing said mixture by heating for a period of 1 to 5 hours to form a suspension of said herbicidal compound, (c) colloidally dispersing said suspension, and (d) mixing said suspension with an emulsion consisting of 20 to 75 wt. percent asphalt, 80 to 25 wt. percent water and 0.4 to 1.0 wt. percent cationic emulsifier, said asphalt, water and emulsifier comprising substantially 100 wt. percent of said emulsion.

References Cited by the Examiner

UNITED STATES PATENTS

| 1,882,377 | 10/32 | Whittelsey | 71—2.1 X |
| 1,988,175 | 1/35 | Merrill | 47—9 X |
| 2,333,959 | 11/43 | Smith | 47—9 |
| 2,741,550 | 4/56 | Emond et al. | 71—2.4 |
| 2,770,537 | 11/56 | Smith et al. | 71—2.6 X |
| 2,851,824 | 9/58 | Campbell | 71—1 |
| 3,061,974 | 11/62 | Louis et al. | 47—9 |

OTHER REFERENCES

Metcalf: "Advances in Pest Control Research," vol. 1, copyright 1957, pages 39–78.

Smith: "The Effect of Asphalt Mulches on the Stabilization of Soils and Aggregate Materials and on Vegetational Cover," an abstract of a thesis, 1953, 11 pages.

JULIAN S. LEVITT, *Primary Examiner.*

LEWIS GOTTS, *Examiner.*